July 10, 1934.  A. G. McGREGOR  1,965,928
METHOD AND MEANS FOR MELTING AND REFINING METALS
Filed Oct. 24, 1931
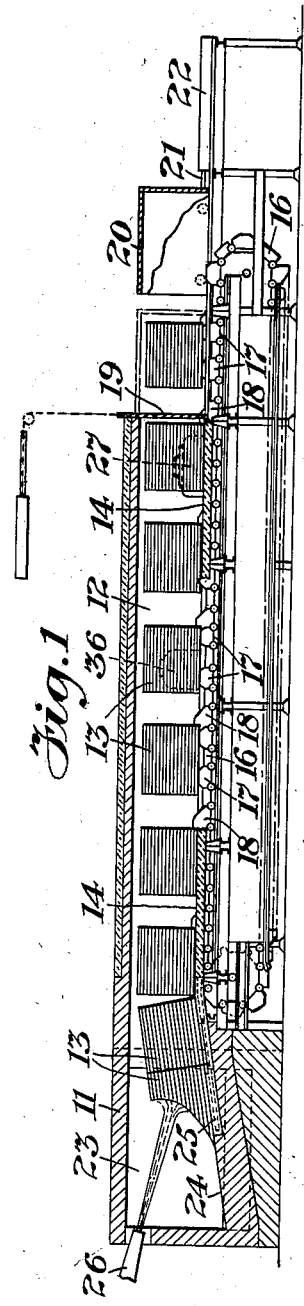
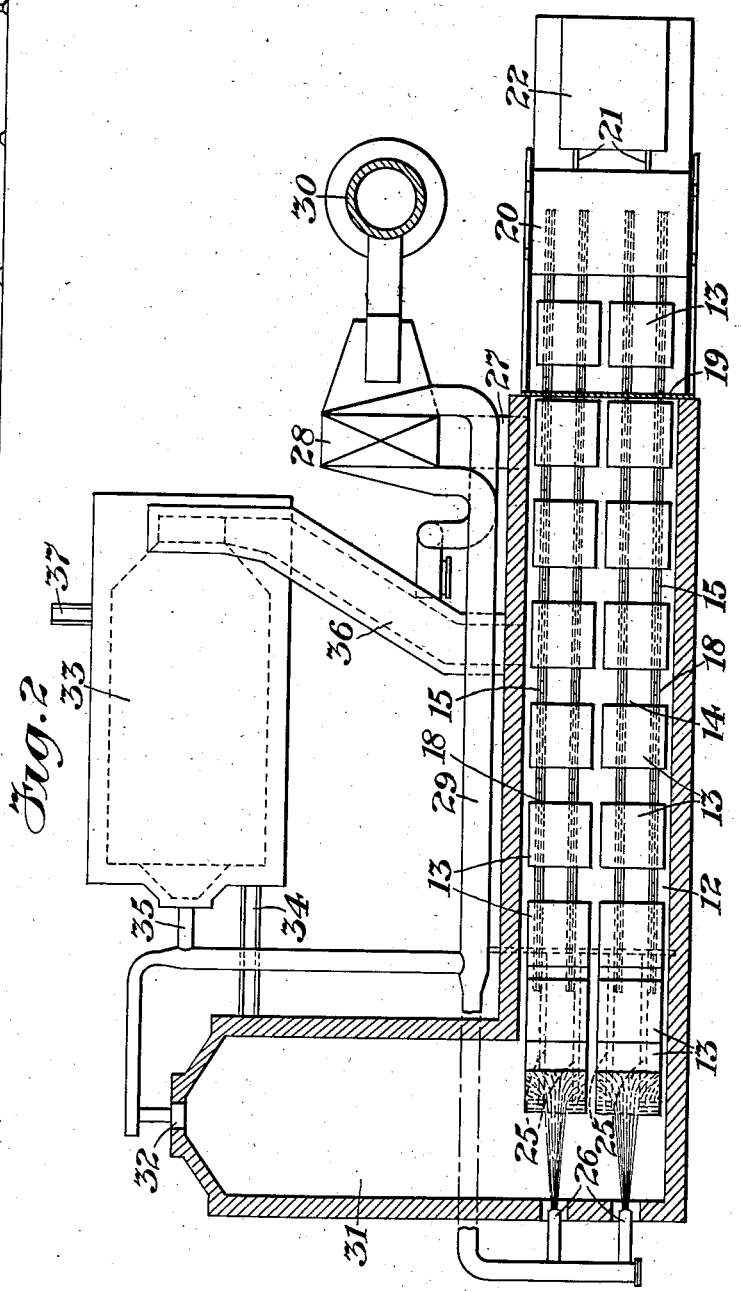
INVENTOR
*Alexander Grant McGregor*
BY
HIS ATTORNEY Patented July 10, 1934

1,965,928

UNITED STATES PATENT OFFICE 1,965,928

METHOD AND MEANS FOR MELTING AND REFINING METALS

Alexander Grant McGregor, London, England

Application October 24, 1931, Serial No. 570,784
In Great Britain November 11, 1930

7 Claims. (Cl. 266—33)

The present invention comprises improvements in or relating to the melting and refining of copper and other metals.

It is the object of the present invention to provide a process of and apparatus for the melting and refining of copper and other metals, which shall be capable of continuous operation and shall be more efficient than the commonly employed method of melting in a reverberatory furnace and poling up to pitch in the melting furnace itself.

The commonly employed process, using a reverberatory furnace, involves treating the metal in batches and the carrying out of the several operations in the same furnace at varying temperatures, with consequent periodic expansion and contraction of the furnace parts, thus resulting in frequent repairs, loss of time in bringing the furnace to a melting heat when the charge is first introduced and large heat losses through the furnace brickwork, a considerable proportion of the heat in the fuel employed never entering the metal to be melted. Furthermore, the process is slow, the treatment of one charge per day being all that can be accomplished.

According to the present invention, the process for the melting and refining of metals is characterized by causing a mass of metal, to be melted, to advance through a preliminary heating zone of the furnace to a melting zone, directing a heating flame directly upon the metal in the melting zone so that the metal is melted in the melting zone at the same rate as that at which it is advanced thereto, and employing the gases from the melting flame to heat the preliminary heating zone. By this means the metal is continuously melted in a zone which is maintained at a constant temperature and the melting takes place by a direct impact of the flame and gases upon the metal itself so that heat is not lost by having initially to heat the furnace arch and walls to a temperature sufficient to bring about the melting by reverberated radiant heat, with the attendant inefficiency and wear on refractories.

Preferably, the metal to be melted is disposed in the preliminary heating zone in separated masses with passages around them so that heating gases from the melting point may flow directly in contact with the metal to be heated and thereby raise its temperature.

The invention comprises a melting furnace having in combination an elongated heating chamber, means for feeding masses of metal to be melted thereto and therethrough to a melting zone at one end of the chamber and a heating burner so arranged as to impinge heating flames directly upon the head of the advancing masses of metal in the melting zone.

Preferably, the heating chamber extends substantially horizontally and the metal masses are conveyed therethrough by means of a chain or like continuous conveyor.

The construction may include a feeding table in the melting zone to which the metal masses are delivered and which is so inclined as to assist movement of the masses toward the melting flame. By this means the conveyor may be allowed to stop short of the melting zone and the final movement of the masses of metal thereinto may be brought about mainly by gravity but partly by the pushing of the mass forward by fresh masses of metal coming up from behind.

Preferably, the conveyor holds the masses of metal separated from one another in the heating zone so that the gases may play freely all round the same. The cross-sectional dimensions of the preliminary heating portion of the heating chamber may be not much greater than the dimensions of the metal masses to be melted, so that in passing around the same the furnace gases are given a considerable velocity, while in the spaces between the metal masses the gases are allowed to come to comparative quiescence. In this way the maximum mixing of the gases and transfer of heat to the metal is effected.

The actual working parts of the conveyor, which may be of the chain type, are preferably disposed outside the furnace, with carrying elements extending into the furnace from the conveyor through slots in the wall of the heating chamber.

Preferably there is provided a holding furnace, means whereby molten metal from the melting zone may be run directly into the holding furnace and there stored, and a reducing furnace in such relation to the holding furnace that oxidized molten metal therefrom may be periodically tapped into the reducing furnace and there poled up to pitch. Thus, the melting is continuous, while the poling and casting can be carried out in batches.

The following is a description by way of example of one construction of refining plant in accordance with the present invention:

The accompanying drawing illustrates the apparatus and in which—

Figure 1 is a longitudinal vertical section through the melting furnace; and

Figure 2 is a plan view partly in section of the furnace showing holding and reducing furnaces connected thereto.

The apparatus, as herein illustrated, comprises an elongated melting furnace 11, horizontally disposed, and which includes a preliminary heating chamber 12 of rectangular cross section and not much larger than the masses 13 of metal to be treated. The floor 14 of the preliminary heating chamber is slotted longitudinally throughout its length as indicated by the four slots 15 shown in the drawing. Below the floor 14 there is mounted a horizontal chain conveyor 16 having carrier blocks 17 extending upwardly through slots 15 in the said floor 14 of the preliminary heating chamber 12 and to a level slightly above the upper surface of the said floor 14. Upon these carrier blocks 17 the piles of ingots, such as blister copper or piles of electrolytically produced copper plate or other masses of metal to be refined, are loaded as indicated at 13.

The chain conveyor 16 is provided with pusher blocks 18, in addition to the carrier blocks 17, said pusher blocks 18 extending upwardly through the slots 15 behind the carrier blocks 17, so as to contact with the back edges of the lowermost plates or ingots in each pile 13 and exert a positive moving force behind the same to carry them through the furnace, the reason for which will hereinafter appear.

At the entering end of the furnace there is a vertically slidable door 19 which may completely close the end of the preliminary heating chamber; opposite to the door 19 and outside the same is a slidably mounted box 20, constituting with the door 19, an air-lock through which the piles 13 of plates or ingots may be introduced into the furnace without admitting air thereto. The box 20 is closed at the top and on three sides, but is open at the bottom where it overlies the conveyor on the fourth side which faces towards the sliding door. This box is slidable to and from the said door 19 by means of an hydraulic ram 21 actuated by the cylinder 22. When the door 19 is closed and the box 20 withdrawn a section of conveyor is exposed to view outside the door 19 and upon it are placed plates or ingots in the form of the piles 13 to be melted.

When a pile 13 is complete the box 20 is advanced by the ram 21 to enclose the pile until the box makes contact with the end of the heating chamber closed by the door 19. The door 19 is then lifted to allow the conveyor to carry the pile slowly forward during its continuous operation and into the furnace. As soon as the pile 13 of plates has thus been carried into the furnace the door 19 is dropped, the box 20 is withdrawn and a fresh pile of metal plates or ingots placed upon a slowly moving conveyor.

At the other end of the furnace there is a melting zone 23, the floor of which is sloped at such an angle that the piles of metal plates, if deposited thereon, will almost, but not quite, slide downwardly of their own weight. This portion of the floor may be arranged with water-cooled skids 25 for said piles 13 to slide upon.

The conveyor 16 operating through the slots 15 in the floor 14 of the preliminary heating chamber brings the piles 13 of metal up to the sloping floor and pushes them thereon. Fresh piles of metal coming up from behind move the piles ahead of them gently down the slope into the melting zone, and thus the piles of plates are separated from one another in the preliminary heating zone 12 but close together in the melting zone 25, and the energy for pressing them down the slope is derived from the pushers 18 previously described, which stand up behind the piles 13 of plates on the conveyor.

Burners 26, the details of which are not illustrated as the specific type of burner comprises no part of the present invention, are so placed that the flames therefrom are directed into the melting zone at the end of the furnace and impinge upon the end of the advancing piles 13 of metal plates, ingots or the like, so as to melt the same at the same rate as that at which the piles 13 are advanced through the apparatus. The flames from these burners may be so regulated as to be oxidizing in character, and thus the molten metal, if copper, may be saturated with cupreous oxide.

The gases from the heating flame pass around the advancing masses of metal and proceed along the preliminary heating chamber 12, heating the piles of copper as they go and are finally withdrawn through a lateral outlet 27 close beside the aforementioned sliding door 19. From here they are led into a recuperative air-heater 28 where the air for the fuel burners is preheated before use. The details of the air heater are not shown as they form no part of this invention, but the air pipe therefrom is shown at 29. The waste gases go to stack 30. Burners 26, 32 and 35 may be oil fuel burners or pulverized fuel burners.

The molten copper produced runs down the slope of the refractory floor 24 on which it is melted and is directed through a large lateral opening in the side of the furnace into an oxidizing or holding furnace 31 which extends at right angles to the general direction of the preliminary heating and melting chambers. In the furnace 31 the copper is maintained in a molten condition by means of fuel burner 32 and this furnace acts as a place of storage where the molten copper may accumulate. Oxidizing conditions may be maintained here if desired.

A reducing furnace 33 is provided adjacent to the oxidizing furnace 31 and connected therewith by a launder 34 so that batches of molten copper may be admitted thereto from the oxidizing furnace from time to time. The reducing furnace 33 is provided with fuel burner 35 for keeping the molten metal at a suitable temperature and the waste gases therefrom are led through a flue 36 into the side of the preliminary heating chamber 12 where the heat is utilized. In the reducing furnace 33 the copper is poled up to pitch in the usual way and from here it is cast through an outlet 37 into ingots for further use.

I claim:

1. The herein described process for melting and refining metals, which includes the steps of advancing bodies of metal through a heating zone to a melting zone, impinging the melting flame against the advancing surface of the metal, and moving the bodies of metal through the heating zone and to the melting zone continuously only at the rate at which the foremost body is melted.

2. The herein described process for melting and refining metals, which includes the steps of advancing bodies of metal through a heating zone to a melting zone, impinging the melting flame against the advancing surface of the metal, moving the bodies of metal through the heating zone and to the melting zone continuously only at the rate at which the foremost body is melted, and circulating the heated gases from the melting zone around the bodies to be melted for preheating the same in the heating zone.

3. The herein described process for melting and refining metals, which includes the steps of advancing separated bodies of metal through a heating zone to a melting zone, impinging the melting flame against the advancing surface of the foremost body, moving the bodies of metal in separated relation through the heating zone and to the melting zone continuously only at the rate at which the foremost body is melted, and circulating the heating gases around the bodies of metal in their spaced condition while in the heating zone.

4. A melting furnace comprising in combination, an elongated heating chamber, feeding means to feed masses of metal to be melted therethrough and to a melting zone at a remote end of the chamber, said means maintaining said masses separated from one another in the heating chamber, heating means impinging a melting flame directly upon the advancing surface of the metal in the melting zone, said feeding means so operable as to regulate the movement of the metal in accordance with the rate of melting of the foremost mass, said chamber confining the gases from the melting flame around the advancing separated masses.

5. A melting furnace comprising in combination an elongated heating chamber, travelling pushers in said heating chamber to feed masses of metal therethrough while maintaining them at a predetermined spacing from one another, a melting zone at one end of said chamber to which said masses are fed, heating means impinging a melting flame directly upon the advancing end of the metal masses in the melting zone, and an outlet for gases from the melting zone, at the end of the heating chamber remote from said zone.

6. A melting furnace, comprising in combination an elongated heating chamber, travelling pushers in said heating chamber to feed masses of metal therethrough while maintaining them at a pre-determined spacing from one another, a melting floor at the delivery end of said heating chamber, heating means impinging a melting flame directly upon the advancing end of the metal masses upon the floor to melt said masses on the melting floor, an outlet for heating gases from the heating means at the end of the heating chamber remote from the melting floor and said chamber confining the heated gases around the advancing separated masses of metal to preheat them.

7. A melting furnace comprising in combination an elongated heating chamber, travelling pushers in said heating chamber to feed masses of metal therethrough while maintaining them at a predetermined spacing from one another, an inclined melting floor at one end of said heating chamber onto which said pushers advance the masses whereby the advance of the metal masses is assisted and they are brought into contact with one another thereon, heating means impinging a melting flame directly upon the advancing end of the metal masses upon the floor and an outlet for heated gasses from the heating means at the end of the heating chamber remote from the melting floor so that heated gases are caused to circulate between the separated masses of metal and preheat them.

ALEXANDER GRANT McGREGOR.